Patented Sept. 5, 1933

1,925,525

UNITED STATES PATENT OFFICE 1,925,525

SEPARATION OF PRODUCTS CONTAINING OXYGEN FROM MIXTURES THEREOF WITH HYDROCARBONS

Wilhelm Dietrich and Max Harder, Oppau, Germany, assignors to I. G. Farbenindustrie Aktiengesellschaft, Frankfort - on - the - Main, Germany No Drawing. Application August 19, 1931, Serial No. 558,098, and in Germany October 11, 1930

12 Claims. (Cl. 260—156)

The present invention relates to the separation of products containing oxygen from mixtures thereof with hydrocarbons.

We have found that organic products containing oxygen can be separated, and dissolved out, from mixtures thereof with non-aromatic hydrocarbons containing at least 8 carbon atoms in an advantageous manner by treating the said mixtures with liquid sulphur dioxide.

The treatment of the mixtures with liquid sulphur dioxide is preferably carried out at temperatures at which the single components are liquid and in the absence of substantial quantities of water. The quantity of liquid sulphur dioxide is generally at least one quarter by volume of the mixtures to be separated and in most cases about 2 to 5 parts by volume will be employed for each part of initial material. The extraction is preferably carried out in a pressure-tight vessel provided with stirrers in which the mixture to be treated is vigorously and thoroughly stirred for a short time with a suitable amount of liquid sulphur dioxide. The height of the temperature is dependent on the products to be treated, but in most cases it should not considerably exceed 75° C. and is generally between 25° and 60° C. After standing for some time two layers are formed which are separated. The upper layer consists mainly of hydrocarbons while the lower layer contains the compounds containing oxygen dissolved in sulphur dioxide. The compounds containing oxygen may be isolated from the solution by evaporating the sulphur dioxide or by freezing. By reason of the difference in the specific gravities of the liquid sulphur dioxide and of the material to be treated, it is possible, and especially advantageous, to work in continuous operation. If the content of the hydrocarbons in the mixture to be treated is comparatively high, a single or repeated treatment with an equal quantity of liquid sulphur dioxide is sufficient. If, on the contrary, the compounds containing oxygen predominate, or if it is desired to isolate a pure product free from hydrocarbons, as for example pure alcohols of high molecular weight from mixtures thereof with hydrocarbons, it is advantageous to reduce the small solvent power of the liquid sulphur dioxide for the hydrocarbons by the addition of small amounts, i. e. of from 1 to 10 per cent, of aliphatic oxygen bearing compounds containing from 2 to 5 carbon atoms such as for example methanol, ethanol, n- and iso-propanol, formic or acetic acids, methyl or ethyl formates, formamide, acetamide or ethyl urethane, which reduce the solubility of the hydrocarbons and, for the sake of brevity, wil be referred to in the following and in the claims as precipitants.

The process according to the present invention is applicable to any mixtures of alcohols, esters, aldehydes and like oxygenated compounds with hydrocarbons of an about equal molecular size but it is particularly valuable for the isolation of the compounds containing oxygen of high molecular weight from mixtures thereof with hydrocarbons such as are obtained by the destructive oxidation of difficultly volatile, non-aromatic hydrocarbons such as of aliphatic open chain or naphthenic hydrocarbons containing at least 8 carbon atoms or mixtures of the same, as for example mineral oil fractions boiling above 180° C. at atmospheric pressure such as paraffin wax, ceresine, Russian gas oil, paraffin oil, or synthetic oils, as for example brown coal tar oils, hydrocarbon mixtures obtained by the destructive hydrogenation of tars, oils and the like, which oxidation can be carried out by means of any oxidizing agents, as for example gaseous mixtures containing oxygen, such as air, oxides of nitrogen or nitric acid or several of these agents conjointly, if desired in conjunction with the well-known oxidation catalysts or agents capable of transferring oxygen. By separating the non-oxidized hydrocarbons from a crude oxidation product a mixture is obtained which, in addition to free carboxylic acids, consists of esters, alcohols of high molecular weight, ketones, lactones and like oxygenated compounds. If desired the acid or the whole saponifiable constituents can be previously separated from the crude oxidation product in the form of soaps, the remaining neutral mixture containing oxygenated compounds being then subjected to the treatment with liquid sulphur dioxide. In this manner a mixture consisting mainly of alcohols of high molecular weight is obtained.

Instead of crude oxidation products, those which have been obtained by a pretreatment or a further treatment, as for example by heating, distillation, catalytic hydrogenation or the like, may be treated according to the present invention. Thus for example a product consisting mainly of alcohols of high molecular weight in addition to hydrocarbons is obtained when a crude oxidation product or a reducible fraction such as acids, or mixtures thereof with esters, aldehydes and ketones separated from the crude oxidation product, has been subjected to a catalytic hydrogenation. The hydrocarbon mixture is then readily separated by treatment with liquid sulphur dioxide according to the present invention.

By the process according to the present invention alcohol mixtures obtained by the catalytic hydrogenation of esters, such as vegetal, i. e. vegetable and animal, oils, fats and waxes and of polyhydric alcohols may be separated from hydrocarbons formed. Furthermore, pure products containing oxygen may be isolated in the same way by separating the alcohol mixture obtained by the condensation of hydrocarbons with oxygen compounds, as for example by the condensation of alkylene oxides or substances forming alkylene oxides with aliphatic or naphthenic hydrocarbons, from the accompanying hydrocarbons.

According to the present invention it is possible in a simple industrial manner to separate the oxygen compounds in a pure form from synthetic mixtures of oxygen-containing compounds with hydrocarbons, without the occurrence of waste. The process according to the present invention is advantageously employed for example when a further conversion, as for example the preparation of emulsifying agents, for example by sulphonation or by treatment with alkalies if acids be present in the mixtures of oxygenated compounds, is contemplated. The pure alcohols of high molecular weight, free from hydrocarbons, may be employed for the preparation of esters or of commercial preparations such as pastes, salves or creams and the like, or yield excellent wetting, emulsifying and cleansing agents after sulphonation (sulphuric esters, sulphonic acids or mixtures of both being obtained according to the sulphonating agents employed and the reaction conditions) and neutralization with alkaline substances.

The following examples will further illustrate the nature of this invention, but the invention is not restricted to these examples. The parts are by volume.

Example 1

From an oxidation product prepared from a Pennsylvanian middle oil having the boiling range of from 180° to 350° C. by blowing the oil with air at 160° C. for 5 hours in the presence of 1 per cent of the oil of manganese naphthenate, the acid constituents present in the free or combined form are removed by saponification with aqueous caustic soda and separating nonsaponifiable matter from the resulting soap solution. The unsaponifiable constituents are subjected to a hydrogenation at 200° C. by means of hydrogen in the presence of a nickel-kieselguhr catalyst, whereby the carbonyl compounds present are partly converted into alcohols.

2000 parts of this product, which has a hydroxyl value of 40, are stirred with 6000 parts of liquid sulphur dioxide in a pressure-tight vessel at 25° C. When the mixture is allowed to stand, two layers are formed. The upper layer consists mainly of hydrocarbons (hydroxyl value 1.3). After withdrawing the lower layer, a liquid mixture consisting mainly of alcohols of high molecular weight and having a hydroxyl value of 95 is obtained by evaporating the sulphur dioxide.

Example 2

2000 parts of an oxidation product obtained from Russian gas oil by destructive oxidation by means of air in the presence of 1 per cent of the oil of manganese naphthenate are stirred with 8000 parts of liquid sulphur dioxide in a pressure-tight vessel for a short time at 28° C. After the mixture has been allowed to stand for a short time two layers separate out. The upper layer which is obtained in an amount of 20 per cent calculated with reference to the oxidation product consists of non-oxidized hydrocarbons which may be employed again for oxidation with air after removing the small amount of adherent sulphur dioxide. The oxidation products are obtained in a yield of 80 per cent from the lower layer after removing the sulphur dioxide.

Example 3

2000 parts of non-saponifiable constituents which are obtained from a product of a destructive oxidation of soft paraffin wax after the separation of the carboxylic acids and hydrogenation of the residual mixture consisting of products containing oxygen and soft paraffin wax, are stirred at 45° C. with 6000 parts of a mixture of liquid sulphur dioxide and formamide (in the proportions of 14:1). After being allowed to stand for some time the layers are separated and freed from solvent. The lower layer contains the alcohols of high molecular weight having a hydroxyl value of about 250 and the upper layer contains the soft paraffin wax.

Acetic acid or formic acid may be employed instead of formamide.

Example 4

20 parts of a product, prepared by the destructive oxidation of soft paraffin wax with the aid of 50 per cent nitric acid at 80° C. and at a pressure of 4 atmospheres and while introducing nitrogen dioxide and releasing nitrogen monoxide until the product shows a saponification value of 200 and subsequently heating the product to 230° C. for 2 hours in a pressure-tight vessel lined with or consisting of a chromium nickel steel, are stirred with 60 parts of liquid sulphur dioxide at 50° C. After settling, an upper layer consisting of non-oxidized hydrocarbons in a quantity of about 35 per cent of the initial oxidation product is obtained, the lower layer consisting of a mixture of oxygenated oxidation products with sulphur dioxide, from which mixture, after removal of the sulphur dioxide, the said oxygenated products are obtained in a yield of 65 per cent of the initial, crude oxidation product.

Example 5

100 parts by weight of spermaceti are subjected to hydrogenation by adding 2 parts by weight of an active hydrogenation catalyst, prepared by heating pulverulent, basic copper carbonate together with 2 per cent by weight of vanadium pentoxide in a current of hydrogen at 350° C., and acting on the whole with hydrogen at 200 atmospheres and 235° C. until the saponification value of the reaction product is less than 10. After cooling, the product is separated from the catalyst by filtration. 25 parts of the reaction product are stirred at 52° C. in a pressure-tight vessel with 60 parts of liquid sulphur dioxide. After short standing, 2 layers are formed, the upper of which consists mainly of hydrocarbons. From the lower layer a mixture consisting mainly of aliphatic alcohols of high molecular weight is obtained after evaporating the sulphur dioxide.

Example 6

1000 parts by weight of a paraffin bearing fraction of Pennsylvanian crude mineral oil with a content of 45 per cent of paraffin wax are mixed with 300 parts of a Friedel-Crafts catalyst, such as anhydrous aluminium chloride, and then treated in a pressure-tight vessel at 30° C. with ethylene oxide at a pressure of 8 atmospheres until the decrease in pressure has ceased. The reaction product is then incorporated with a mixture of ice and water and the water-insoluble reaction product is separated from the aqueous layer. 20 parts of the reaction product which possesses a hydroxyl value of 70, are intimately stirred at 48° C. in a pressure-tight vessel with 80 parts of liquid sulphur dioxide. After short standing, 2 layers are formed which are separated from each other. The upper layer has a hydroxyl value of 3.8 and consists mainly of hydrocarbons. From the lower layer a semi-solid mixture, having a hydroxyl value of 180 and consisting mainly of aliphatic alcohols of high molecular weight, is obtained after evaporation of the sulphur dioxide.

What we claim is:—

1. The process for separating non-aromatic oxygenated products containing at least 8 carbon atoms from mixtures thereof with saturated non-aromatic hydrocarbons containing at least 8 carbon atoms which comprises acting with liquid sulphur dioxide and from 1 to 10 per cent of its weight of a liquid, aliphatic oxygen-bearing compound, selected from the group consisting of aliphatic alcohols and aliphatic acids containing up to 3 carbon atoms, esters of the said alcohols with the said acids and amides of the said acids on the said mixtures in the liquid state at a temperature below 75° C. and separating the layers formed.

2. The process for separating non-aromatic oxygenated products containing at least 8 carbon atoms from mixtures thereof with saturated non-aromatic hydrocarbons containing at least 8 carbon atoms which comprises acting with at least one unit by volume of liquid sulphur dioxide and from 1 to 10 per cent of its weight of a liquid, aliphatic oxygen-bearing compound, selected from the group consisting of aliphatic alcohols and aliphatic acids containing up to 3 carbon atoms, esters of the said alcohols with the said acids and amides of the said acids on four units by volume of the said mixtures in the liquid state and separating the layers formed.

3. The process for separating non-aromatic oxygenated products containing at least 8 carbon atoms from mixtures thereof with saturated non-aromatic hydrocarbons containing at least 8 carbon atoms which comprises acting with from one to twenty units by volume of liquid sulphur dioxide and from 1 to 10 per cent of its weight of a liquid, aliphatic oxygen-bearing compound, selected from the group consisting of aliphatic alcohols and aliphatic acids containing up to 3 carbon atoms, esters of the said alcohols with the said acids and amides of the said acids on four units by volume of the said mixtures in the liquid state at a temperature below 75° C. and separating the layers formed.

4. The process for separating non-aromatic oxygenated products containing at least 8 carbon atoms from mixtures thereof with saturated non-aromatic hydrocarbons containing at least 8 carbon atoms which comprises acting with from one to twenty units by volume of liquid sulphur dioxide and from 1 to 10 per cent of its weight of a liquid, aliphatic oxygen-bearing compound, selected from the group consisting of aliphatic alcohols and aliphatic acids containing up to 3 carbon atoms, esters of the said alcohols with the said acids and amides of the said acids on four units by volume of a product of the destructive oxidation of mixtures of difficultly volatile non-aromatic hydrocarbons, at a temperature below 75° C. but while keeping said product in the liquid state, and separating the layers formed.

5. The process for separating non-aromatic oxygenated products containing at least 8 carbon atoms from mixtures thereof with saturated non-aromatic hydrocarbons containing at least 8 carbon atoms which comprises acting with from eight to twenty units by volume of liquid sulphur dioxide and from 1 to 10 per cent of its weight of a liquid, aliphatic oxygen-bearing compound, selected from the group consisting of aliphatic alcohols and aliphatic acids containing up to 3 carbon atoms, esters of the said alcohols with the said acids and amides of the said acids on four units by volume of a product of the destructive oxidation of mixtures of difficultly volatile non-aromatic hydrocarbons, at a temperature below 75° C. but while keeping said product in the liquid state, and separating the layers formed.

6. The process for separating non-aromatic oxygenated products containing at least 8 carbon atoms from mixtures thereof with saturated non-aromatic hydrocarbons containing at least 8 carbon atoms which comprises acting with from eight to twenty units by volume of liquid sulphur dioxide and from 1 to 10 per cent of its weight of a liquid, aliphatic oxygen-bearing compound, selected from the group consisting of aliphatic alcohols and aliphatic acids containing up to 3 carbon atoms, esters of the said alcohols with the said acids and amides of the said acids on four units by volume of a liquid product of the destructive oxidation of mixtures of difficultly volatile non-aromatic hydrocarbons, from which product the acid constituents have been removed, at a temperature below 75° C. but while keeping said product in the liquid state, and separating the layers formed.

7. The process for separating non-aromatic oxygenated products containing at least 8 carbon atoms from mixtures thereof with saturated non-aromatic hydrocarbons containing at least 8 carbon atoms which comprises acting with from eight to twenty units by volume of liquid sulphur dioxide and from 1 to 10 per cent of its weight of a liquid, aliphatic oxygen-bearing compound, selected from the group consisting of aliphatic alcohols and aliphatic acids containing up to 3 carbon atoms, esters of the said alcohols with the said acids and amides of the said acids on four units by volume of a liquid hydrogenated product of the destructive oxidation of mixtures of difficultly volatile non-aromatic hydrocarbons, at a temperature below 75° C. but while keeping said product in the liquid state, and separating the layers formed.

8. The process for separating non-aromatic oxygenated products containing at least 8 carbon atoms from mixtures thereof with saturated non-aromatic hydrocarbons containing at least 8 carbon atoms which comprises acting with from eight to twenty units by volume of liquid sulphur dioxide and from 1 to 10 per cent of its weight of a liquid, aliphatic oxygen-bearing compound, selected from the group consisting of aliphatic alcohols and aliphatic acids containing up to 3 carbon atoms, esters of the said alcohols with the said acids and amides of the said acids on four units by volume of a liquid product of the destructive oxidation of a mineral oil fraction boiling normally above 180° C., at a temperature below 75° C. but while keeping said product in the liquid state, and separating the layers formed.

9. The process for separating non-aromatic oxygenated products containing at least 8 carbon atoms from mixtures thereof with saturated non-aromatic hydrocarbons containing at least 8 carbon atoms which comprises acting with from eight to twenty units by volume of liquid sulphur dioxide and from 1 to 10 per cent of its weight of a liquid, aliphatic oxygen-bearing compound, selected from the group consisting of aliphatic alcohols and aliphatic acids containing up to 3 carbon atoms, esters of the said alcohols with the said acids and amides of the said acids on four units by volume of a liquid product of the destructive oxidation of a mineral oil fraction boiling normally above 180° C., at a temperature between 25° and 60° C. but while keeping said product in the liquid state, and separating the layers formed.

10. The process for separating non-aromatic oxygenated products containing at least 8 carbon atoms from mixtures thereof with saturated non-aromatic hydrocarbons containing at least 8 carbon atoms which comprises acting with from eight to twenty units by volume of liquid sulphur dioxide and from 1 to 10 per cent of its weight of a liquid, aliphatic oxygen-bearing compound, selected from the group consisting of aliphatic alcohols and aliphatic acids containing up to 3 carbon atoms, esters of the said alcohols with the said acids and amides of the said acids on four units by volume of a liquid hydrogenated product of the destructive oxidation of a mineral oil fraction boiling normally above 180° C. at a temperature between 25° and 60° C. but while keeping said product in the liquid state, and separating the layers formed.

11. The process for separating oxygenated non-aromatic products containing at least 8 carbon atoms from mixtures thereof with saturated non-aromatic hydrocarbons containing at least 8 carbon atoms which comprises acting with from eight to twenty units by volume of liquid sulphur dioxide and from 1 to 10 per cent of its weight of a liquid, aliphatic oxygen-bearing compound, selected from the group consisting of aliphatic alcohols and aliphatic acids containing up to 3 carbon atoms, esters of the said alcohols with the said acids and amides of the said acids on four units by volume of a product of the hydrogenation of vegetal oils, at a temperature between 25° C. and 60° C. but while keeping said product in the liquid state, and separating the layers formed.

12. The process for separating non-aromatic oxygenated products containing at least 8 carbon atoms from mixtures thereof with saturated non-aromatic hydrocarbons containing at least 8 carbon atoms which comprises acting with at least one unit by volume of liquid sulphur dioxide and from 1 to 10 per cent of its weight of a liquid, aliphatic oxygen-bearing compound, selected from the group consisting of aliphatic alcohols and aliphatic acids containing up to 3 carbon atoms, esters of the said alcohols with the said acids and amides of the said acids on four units by volume of a liquid, water-insoluble Friedel-Crafts condensation product of a mineral oil fraction with ethylene oxide and separating the layers formed.

WILHELM DIETRICH.
MAX HARDER.